United States Patent [19]
Muller

[11] Patent Number: 5,177,418
[45] Date of Patent: Jan. 5, 1993

[54] SWEEP CONTROL APPARATUS FOR WINDSHIELD WIPERS

[75] Inventor: Guy Muller, Bievres, France

[73] Assignee: Valeo Systemes D'Essuyage, Montigny-Le-Bretonneux, France

[21] Appl. No.: 619,984

[22] Filed: Nov. 30, 1990

[30] Foreign Application Priority Data

Dec. 4, 1989 [FR] France ................. 89 15978

[51] Int. Cl.⁵ ............................................ H02P 3/00
[52] U.S. Cl. ............................ 318/265; 318/DIG. 2; 15/250.17
[58] Field of Search .................. 318/280-286, 318/443, 444, DIG. 2, 264-266, 256, 466-470, 616, 626; 15/250.12, 250.13, 250.17

[56] References Cited

U.S. PATENT DOCUMENTS

| | | | |
|---|---|---|---|
| 4,529,920 | 7/1985 | Yoshida et al. | 318/466 |
| 4,563,625 | 1/1986 | Kornbrekke et al. | 318/283 X |
| 4,585,980 | 4/1986 | Gille et al. | 318/444 |
| 4,663,575 | 5/1987 | Juzswik et al. | 318/444 |
| 4,665,488 | 5/1987 | Graham et al. | 318/444 X |
| 4,713,591 | 12/1987 | McCloskey | 318/282 X |
| 4,742,280 | 5/1988 | Ishikawa et al. | 318/282 |
| 4,866,357 | 9/1989 | Miller et al. | 318/443 |
| 4,900,996 | 2/1990 | Wainwright | 318/443 |

FOREIGN PATENT DOCUMENTS 2637934 2/1977 Fed. Rep. of Germany.
3208121 9/1983 Fed. Rep. of Germany.
3441842 5/1986 Fed. Rep. of Germany.

Primary Examiner—A. Jonathan Wysocki
Attorney, Agent, or Firm—Dennison, Meserole, Pollack & Scheiner

[57] ABSTRACT

A sweeping apparatus such as a control system for windshield wipers includes a regulating means which generates a electrical control signal for three separate wiper control means or "paths". Each path includes a differential stage followed by a motor control strage, for controlling a motor having a driven shaft on which a digital coder is mounted. The magnitude of the output signal of the latter is processed in a feedback loop by a processing circuit and passed to the input differential stage. The outputs of the various differential stages are applied to respective comparators. The latter transmit a blocking signal via a NO or OR gate, to the regulating means when the input signal to the comparator exceeds a predetermined threshold value.

The invention is especially applicable to automotive windshield wiper systems.

9 Claims, 1 Drawing Sheet

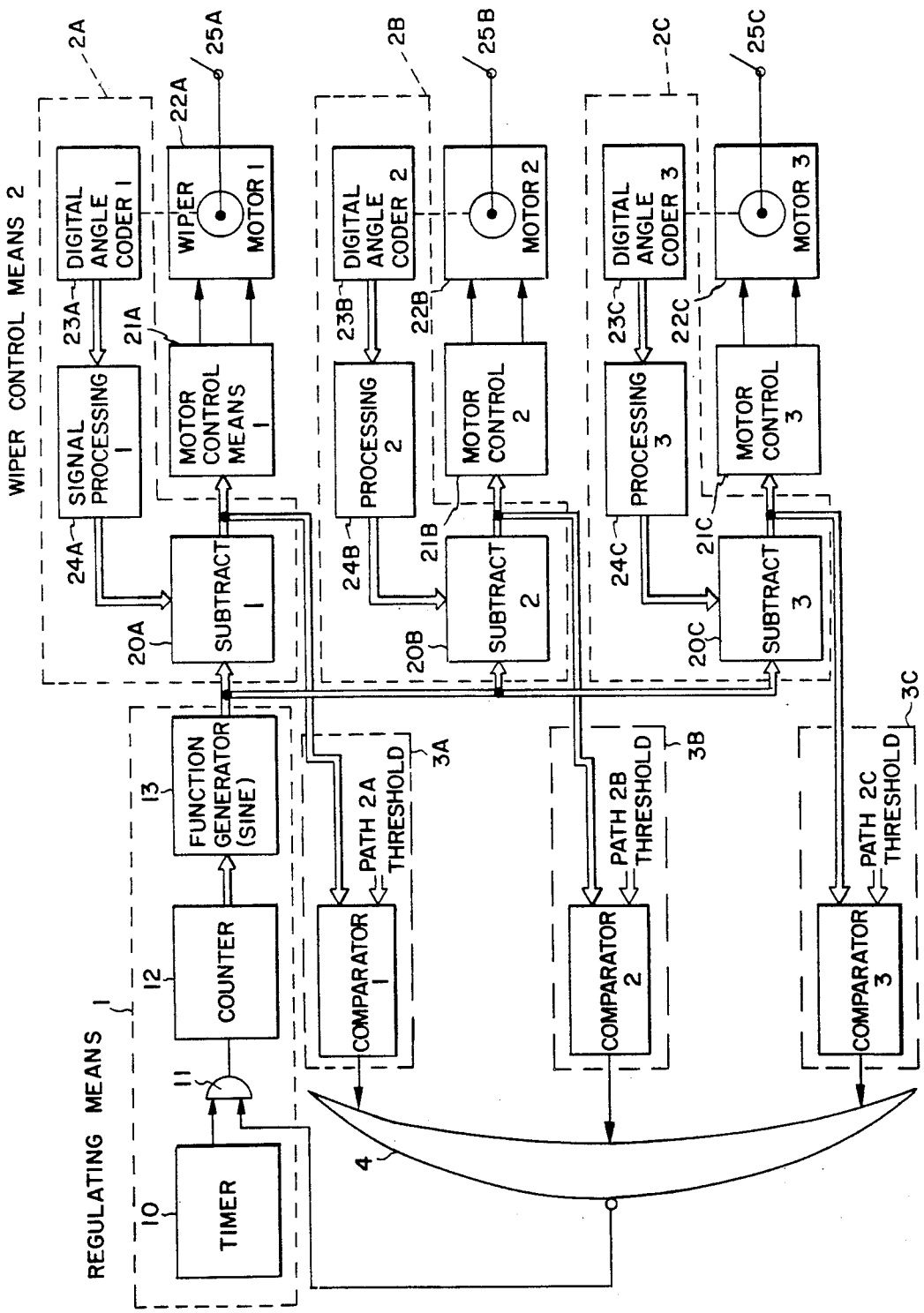

5,177,418

SWEEP CONTROL APPARATUS FOR WINDSHIELD WIPERS

FIELD OF THE INVENTION

This invention relates to apparatus for controlling the operation of mechanical sweeping devices, and is most particularly applicable to the windshield wiper systems of automotive vehicles.

BACKGROUND OF THE INVENTION

An improvement in electro-mechanical sweeping or wiping systems has been proposed, which comprises:

a regulating means for generating an electrical control signal which changes as a function of time in accordance with a demanded sweeping characteristic; and at least one wiper motor control means, comprising a wiper motor, a control stage for the said wiper motor, a detector for detecting the angular position of a part driven by the motor, and a feedback circuit for applying to the motor control stage an electrical error signal representing the difference between the control signal and a signal representing the actual detected position.

This new arrangement is of great importance, to the extent that is considerably simplifies the design of sweeping apparatus such as a windshield wiper installation. In particular, it eliminates the need for a mechanical linkages because the motor shaft is alternately rotated clock and anticlockwise.

In addition, it considerably increases the range of possible modes of sweeping or wiping angles which may be obtained, for example multiple speeds, intermittent operation, and the provision of a parking position for the windshield wipers.

It has however been noted that under exceptional conditions, the control system may prove unable to force one of the motors to be in the demanded position in its arc of sweep at each point in time, this is while only a disadvantage with a single windshield wiper, it is a much greater drawback where there are a plurality of windshield wipers, since the wipers may then be in a condition to interfere with each other.

DISCUSSION OF THE INVENTION

A principal object of the invention is to provide a solution to this problem.

In accordance with the invention, the sweep control apparatus defined herein additionally comprises a comparator for comparing the amplitude of the electrical error signal to a predetermined threshold value, and means for disabling the regulating means when the amplitude of the electrical error signal exceeds the threshold value.

The comparator operates on absolute values of the error signal and preferably on digital signals. It is of particular advantage, though not essential, that the regulating means, the position detector, the feedback circuit and the comparator will all operate on digital signals. In that case, the extent of sweep performed by each wiper, i.e. in respect of each wiper control means, is taken into account at the level of the motor control stage and position detector, or in the accompanying processing means that forms part of the feedback circuit.

In one preferred embodiment, the regulating means includes a timer, a counter and a function generator which is addressed by the counter output which increases in accordance with clock pulses generated by the timer. The disabling means are then arranged to interrupt the transmission of the clock pulses to the address counter when the amplitude of the electrical error signal exceeds the threshold value. This threshold value may be set at a fraction of the order of one tenth of the maximum control voltage (or signal) of the motor. As will be seen later on herein, a particularly significant form of operation is thus obtained.

Further objects and advantages of the invention will become apparent from the drawing and the detailed description which follows.

BRIEF DESCRIPTION OF THE DRAWING

The single FIGURE of the drawing illustrates the preferred embodiment of the invention.

DESCRIPTION OF A PREFERRED EMBODIMENT OF THE INVENTION

As shown in the drawing, the regulating means 1 is common to a plurality of wiper control means, 2. These wiper control means comprise a first, second and third signal path 2A, 2B and 2C respectively. The control means 1 comprises a timer 10 connected into one input of an AND gate 11, the other input of which is normally in a conducting state. The AND gate 11 transmits clock pulses from the timer 10 to a counter 12 which produces count outputs and in turn, addresses a function generator 13. In response to the clock pulses the function generator produces digital signals varying in time as a sinusoidal function. The period of this function defines the wiping speed, and is adjusted by varying the frequency of the clock pulses issued for the timer 10. Intermittent operation of the windshield wipers may also be obtained by controlling the transmission of the clock pulses during a single half-cycle of the sinusoidal function.

The sinusoidal by changing values which are thus available at the output of the function generator 13 represent the sequence of desired wiper positions and are applied at a first input of subtractors 20A, 20B and 20C, which respectively form part of the paths 2A, 2B and 2C. In the remainder of this description, only the path 2A will be described in detail, the other paths 2B and 2C being similar in their structure and method of operation.

Each path includes a wiper motor 22A, an oscillating driven part 25A or shaft and a digital angle coder 23A mounted on the motor shaft for generating actual shaft position signals.

Although alternative modes of operation are possible, it will be assumed for the purposes of this example that the output of the digital angle coder is normalised with respect to the total sweep angle that is demanded of the associated motor 22A. For example, if different sweep angles are required of the three motors, the full range of output from the digital angle coders 23A, 23B and 23C will be the same, and will correspond in each case to the full wiping sweep angle of the associated motor.

The values of actual angular position signals of the motor shaft which are thus coded at 23A are transmitted to a signal processing circuit 24A. The circuit 24A can give a required scale, if necessary, to the signals, and primarily takes account of motor speed in the feedback loop 24A, 20A, in order to preserve the stability of the motor speed in the manner which is known to the person skilled in the art. The output of the circuit 24A is connected to the second input of the respective associated subtractor 20A. The resultant difference signal then passes to a control stage 21A of the associated wiper motor. This difference signal acts as an error signal, and the control stage 21A concerned operates in response to it so as to control the rotary position of the motor shaft in the appropriate direction tending to reduce the error signal. Since the sinusoidal function generator produces output signals which change from positive to negative values, the motor is controlled so as to oscillate.

Further, each motor control stage 21A, 21B, 21C must take account of the full extent of the sweep carried out by the motor concerned. These control stages may be arranged to operate in different ways. On suitable method, where the motor 22 is a direct current motor, consists in transmitting a pulsed control signal to the latter, the number of pulses per unit time being dependent on the amplitude of the error signal.

The feedback loops which are thus formed from coder 23A, circuit 24A and subtractor 20A operate in a well known manner which is also described in French patent specification No. 89 08442, to which they constitute an improvement in digital form. It will be understood that they will, in general, allow the shaft of each motor 22 to be positioned in a manner which is defined by the function generator 13, having regard to the extent of the wiping sweep carried out by the motor. In addition, where there is on a single function generator 13, the three wiper motors will necessarily operate in synchronism. Conditions may exit where the torque developed by one of the motors in response to the control signal is insufficient to overcome mechanical resistance forces arising due to friction or to obstacles that interfere with the wiping action. The embodiment of the invention here described offers a solution to the problem.

To this end, the error signals which are produced at the output of each of the subtractors 20A, 20B and 20C are also transmitted to respective digital comparators 3A, 3B and 3C, each of which is provided with a threshold signal at a second input. The threshold signal to each of the comparators may be different. In this example, to the extent that the error signal is the same, and with adaptation of the sweep angle of each motor taking place "downstream", these threshold signals may selected to be of identical value.

The comparators compare the value of the error signal with the threshold value. The sign of the error signal is ignored.

When one of the comparators detects that the error signal exceeds the threshold value, its output signal is passed to an OR gate 4, the output of which causes the second input of the gate 11 to become non-conducting, and consequently to block the transmission of from the timer 10 to the counter 12. The result of this is that the regulating signal is fixed at its last instantaneous value, so long as one of the comparators responds to an error signal that exceeds its preset threshold value.

For example in the event of excessive friction occurring only temporarily, such that the motor does overcome this friction but operates at a slower speed than in the case of its friction less operation, the error signal progressively diminishes, and it become possible, once it has gone below the threshold value, to revert to synchronous operation with the other motors.

If on the other hand there is some obstacle in the way of the system, which the motor is unable to overcome, the windshield wiper systems are then completely stalled. At that moment, an alarm signal may be transmitted to an external operating unit of a suitable kind for informing the driver so that the latter can then act to clear the obstacle. A classic situation is one in which, in winter, the windshield wipers 25 of a vehicle are blocked with snow. The alarm signal could then serve, for example, to initiate a de-icing operation until the windshield wiper system is once again able to operate normally.

In the embodiment which has just been described, all or some of the digital functions could of course be carried out in a device of the microprocessor type. Again, the present invention may equally be applied in an analogue, rather than a digital, embodiment. In that case, the regulating means 1 may comprise a controlled sawtooth generator, followed by a sinusoidal function generator, and integration of the sawtooth wave. The stages 20 are then operational amplifiers. The angular coders may then be either of digital or analogue form, as may the processing circuit 24.

It is also possible, instead of providing a single function generator 13 common to all of the wiper control means such as 2A, 2B and 2C, to provide a dedicated function generator 13 for each motor control means. This approach can be adopted if it is desired to provide wiping functions that are more sophisticated or slightly different for each motor. Under these conditions it is possible to provide different threshold values for each of the comparators 3A to 3C. It will of course be realised that the wiping action may follow a characteristic pattern that is not necessarily sinusoidal.

Typically, it is possible to use, in order to carry out a windshield wiping operation extending over 110°, direct current motors for which the maximum control voltage is of the order of 10 volts, or about 100 millivolts per degree of sweep. The experiments carried out up to the present time by the Applicant have shown that the setting of the threshold value for the comparators at about one twentieth of the full control value for the motor allows a satisfactory result to be obtained. This value could however be modified according to particular applications. The invention is applicable to a windshield wiping arrangement having only one wiper control means, but it is most relevant in a windshield wiping system having two and more, particularly three motors such as systems which are commonly provided on certain heavy good or other transport vehicles.

In the foregoing, the system has been provided with a monitoring system for abnormal situations. It may also serve, with great advantage, in normal situations in order to regular to the wiping speed. In that case, the threshold values of the comparators are set at a value which is lower than that indicated above. In an entirely unexpected manner, it has been noted that windshield wiping systems operating in a synchronised manner will then properly relate to each other when one of them temporarily meets a friction force which is higher than normal.

What is claimed is:

1. Sweep control apparatus for a windshield wiper system comprising:
   a. regulating means for generating a sequence of desired position signals in accordance with a selected sweep characteristic, b. a wiper motor having a shaft and a driven part connected thereto, c. a position detector for generating a sequence of actual position signals of the driven part, d. an error signal generating means responsive to said desired position signals and to said actual position signals, e. a motor control means responsive to said error signals and generating DC voltage control signals for said wiper motor, and f. means responsive to said error signals and to a predetermined threshold signal for generating a signal for disabling said regulating means and thus the wiper motor operation whenever said error signal exceeds the predetermined threshold signal.

2. Apparatus according to claim 1, further including at least one additional wiper motor, position detector, error signal generating means and motor driver, wherein said regulating means desired position signals are applied to said additional error signal generating means for generating additional error signals which are applied to the additional motor driver so that the wiper motors operate in synchronism.

3. Apparatus according to claim 1 wherein said means responsive to said error signals includes a comparator which outputs a disabling signal whenever the absolute value of the error signal exceeds the predetermined threshold signal.

4. Apparatus according to claim 3, wherein the comparator compares the said error signals with a threshold value which corresponds to a fraction of the order of one tenth of the maximum control voltage for the motor.

5. Apparatus according to claim 3 wherein a plurality of wiper motors are controlled and thus a plurality of error signals are present, a plurality of comparators responding to the absolute values for comparison with respective threshold values, an OR gate with inputs connected to the output signals of the comparator sand its output generating the disabling signal when at least one of the error signals exceeds the predetermined threshold so as to disable all the motors.

6. Apparatus according to claim 5 wherein the regulating means comprises a timer for outputting clock pulses, a gate having a first input for transmitting the clock pulses in the absence of the disabling signal, said OR gate output which represent the disabling signal applied to a second input of the gate so as to inhibit the transmission of the clock pulses.

7. Apparatus according to claim 1, wherein said regulating means comprises a clock pulse generator, a counter for generating successive count outputs, a function generator responding to said count outputs and for outputting a sequence of digital values which change in time according to a sinusoidal function.

8. Apparatus according to claim 7, wherein said regulating means generates the digital sinusoidal function values to control the instant position of the driven part and the number of clock pulses per unit time determines the motor speed.

9. Apparatus according to claim 1, wherein the said regulating means, position detector, feedback means and comparator perform digital operations, the apparatus being adapted so that the extent of sweep performed by the driven part of the motor is taken into account.

* * * * *